Patented June 17, 1958

2,839,530

NOVEL CHEMICAL COMPOUNDS

Raymond Jacques Horclois, Malakoff, France, assignor to Societe des Usines Chimiques Rhone-Poulenc, Paris, France, a French body corporate No Drawing. Application November 19, 1956
Serial No. 622,744

Claims priority, application France November 23, 1955

1 Claim. (Cl. 260—243)

This invention relates generally to certain novel organic chemical compounds and more particularly it is concerned with new 10-polyalkylaminoalkyl phenthiazines useful in chemotherapy.

It is known that certain 10-aminoalkyl-phenthiazines possess interesting therapeutic properties. Extensive research and experimentation has shown, however, that both the size of the therapeutic index and the nature of the therapeutic effect exhibited by certain compounds of this type can be changed radically or even eliminated by what would appear to be merely small changes in their chemical structure or their chemical composition. These changes in therapeutic effects, unfortunately, cannot be correlated at present with changes in molecular configuration, hence it is not possible to forecast what will occur when the structure of a compound having certain recognised properties is altered. Particularly is this the case with these phenthiazines when variations are made in the nature and length of the side chain attached to the 10-position nitrogen atom.

In accordance with the present invention, new phenthiazine derivatives are provided which are found to possess particularly interesting pharmacological properties. More particularly, as compared to phenthiazine derivatives previously known, it is found that these compounds possess outstanding spasmolytic properties while undesirable secondary effects are less pronounced.

These new phenthiazine derivatives of the present invention are the organic nitrogenous base 10-[2,4-bis(dimethylamino)-1-butyl]phenthiazine, which may be represented by the formula:

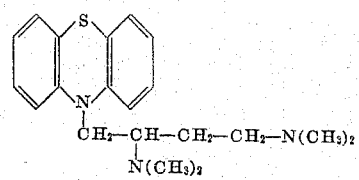

and salts thereof as hereinafter defined.

According to one aspect of the present invention, a particularly advantageous process for the preparation of the said phenthiazine compound of formula I consists in methylation of an amine of the formula:

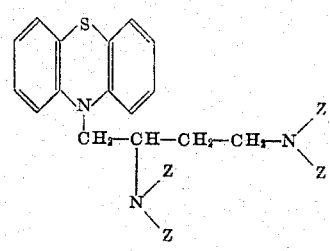

wherein Z, in each instance, is either hydrogen or methyl and, in at least one instance, is hydrogen.

This process may be carried into effect upon the selected primary amine by using any conventional methylating agent at choice, such as the use of a reactive methyl ester, e. g. a methyl halide or dimethyl sulphate; the use of a mixture of formaldehyde and formic acid; or by use of formaldehyde and hydrogen in the presence of a catalyst. The method presently chiefly preferred is use of formaldehyde and formic acid.

The new phenthiazine base of the present invention has outstanding utility as a spasmolytic of the papaverine type. In that respect it constitutes a valuable drug for treatment of inter alia amoebic colitis, enterocolitis, oesophagism and cardiospasm.

Acid addition salts of the base containing pharmaceutically acceptable anions, such as the hydrochloride or other hydrohalide salts, 8-chlorotheophyllinate, phosphate, nitrate, sulphate, maleate, fumarate, citrate, tartrate, oxalate, methane sulphonate and ethane disulphonate; and quaternary ammonium salts, obtained by reaction of the base with an organic halide, e. g. methyl or ethyl iodide, chloride or bromide, or allyl or benzyl chloride or bromide, or other reactive esters, are particularly satisfactory therapeutically acceptable forms for facilitating administration of the base. Reference herein to salts of the base is to be understood as having this particular and limited significance.

To facilitate a fuller and more complete understanding of the subject matter of this invention, a specific example follows, provided by way of illustration merely and not by way of any limitation upon the subjoined claim.

Example

Approximately 10.3 grams of 10-(2-dimethylamino-4-amino-1-butyl)phenthiazine is heated under reflux for 48 hours with about 10 cubic centimeters of 30% formaldehyde and 15 cubic centimeters of 98% formic acid until evolution of carbon dioxide ceases. The mixture is acidified by addition of hydrochloric acid (d.=1.19) until it is acid to Congo red paper (about 7 cubic centimeters of acid required) and then is evaporated to dryness. The residue is dissolved in about 50 cubic centimeters of water and extracted with two fifty cubic centimeter volumes of ether. The aqueous layer is made alkaline by addition of about 10 cubic centimeters of aqueous caustic soda (d.=1.33) and extracted with three fifty cubic centimeter volumes of chloroform. The desired reaction product, the base 10-[2,4-bis(dimethylamino)-1-butyl]-phenthiazine, distilling at 185°–188° C. at a pressure of 0.5 millimeter of mercury, is obtained in a yield of about 6.2 grams.

Treatment of 4.5 grams of 10-[2,4-bis(dimethylamino)-1-butyl]phenthiazine in 27 cubic centimeters of ethanol with about 3.2 grams fumaric acid yields the acid difumarate (about 6.7 grams) which is found to melt at 176–177° C.

10 - (2 - dimethylamino - 4 - amino - 1 - butyl)phenthiazine may be obtained in a yield of about 10.6 grams by reduction of 12 grams of 10-(2-dimethylamino-3-cyano-1-propyl)phenthiazine by means of lithium aluminum hydride. 10-(2-dimethylamino-3-cyano-1-propyl)-phenthiazine, the hydrochloride of which melts at 222°–223° C., may be prepared by action of potassium cyanide on 10-(3-dimethylamino-2-chloro-1-propyl)phenthiazine. During the course of this reaction, isomerisation by intramolecular rearrangement occurs and 10-(2-dimethylamino-3-cyano-1-propyl)phenthiazine is obtained instead of 10-(3-dimethylamino-2-cyano-1-propyl)phenthiazine.

Having thus described the subject matter of this invention, what it is desired to secure by Letters Patent of the United States is:

As a new composition of matter, a substance selected from the group consisting of the organic nitrogenous base 10 - [2,4 - bis(dimethylamino) - 1 butyl]phenthiazine, and acid addition salts of said organic nitrogenous base that contain a pharmaceutically acceptable anion.

References Cited in the file of this patent

UNITED STATES PATENTS 2,789,978    Rath _____ Apr. 23, 1957

FOREIGN PATENTS 1,060,189    France _____ Nov. 18, 1953